Patented Sept. 22, 1953

2,653,151

UNITED STATES PATENT OFFICE 2,653,151

PURIFICATION OF STREPTOMYCIN

Herman Sokol, Hasbrouck Heights, N. J., and Robert P. Popino, Brooklyn, N. Y., assignors to Heyden Chemical Corporation, New York, N. Y., a corporation of Delaware No Drawing. Application February 17, 1950, Serial No. 144,848

9 Claims. (Cl. 260—210)

This invention relates to a process for preparing substantially pure streptomycin and streptomycin salts from impure or crude streptomycin preparations. More particularly, it relates to the preparation of streptomycin and streptomycin salts of high potency from low assay preparations which cannot be purified effectively by recrystallization or other means.

Streptomycin is an extremely potent antibiotic substance produced in stationary and submerged cultures of streptomycin-producing strains of Actinomyces griseus as reported by Waksman, et al. in Pro. Soc. Exptl. Med.—1944, 55, 66–69 and in United States Patent Number 2,449,866. This antibiotic possesses remarkable therapeutic properties and has been found to exert strong bacteriostatic action against a wide variety of pathogenic organisms. The bacteriostatic spectrum of streptomycin indicates its effective action against gram positive aerobic spore-forming bacteria such as B. mycoides as well as gram negative bacteria such as E. coli and certain strains of salmonella.

In the production of the streptomycin by the fermentation of a suitable aqueous nutrient medium such as one containing glucose, peptone, corn steep liquor, sodium chloride, etc. with certain strains of S. griseus the valuable antibiotic material is formed in relatively small quantities in the culture liquor and must be removed and recovered by a series of fairly complicated extraction steps prior to its use in therapeutic applications. The problem involved in the separation of this complex active substance from large amounts of inactive impurities is attributable in part to the fact that both the antibiotic and these impurities possess similar solubility properties.

A conventional method for the recovery of streptomycin, i. e. the free base and salts thereof, from the culture media and fermentation broth involves a separation of the organism growth from the culture broth by filtration, treating the filtrate with an adsorbent such as activated charcoal, the antibiotic being completely adsorbed thereon, followed by elution with suitable solvents adjusted to provide a solution which is acidic in character. The streptomycin is obtained in the form of a crude amorphous hygroscopic powder. This process is not very satisfactory, however, since extraneous material is adsorbed and eluted together with the streptomycin. Adsorption of this drug by the use of ion-exchange resins has also failed to be fully effective in obtaining pure concentrates of the antibiotic because of incomplete separation of streptomycin from certain cationic impurities normally found in the broth.

Since the antibiotic material obtained by either of these methods is of relatively low potency, it is desirable to remove the impurities present therein as these impurities may be responsible for the undesirable side effects caused by the administration of this drug. To obviate difficulties of this nature and to insure more effective therapeutic results, highly purified or potent forms of this drug are preferred.

It has now been discovered that a crude concentrate of a streptomycin salt obtained from the fermentation broth by methods mentioned above or similarly related thereto, can be effectively and readily purified to yield high potency preparations by a simple and rapid method. The antibiotic is obtained in good yields and in a highly purified form substantially free from discoloration. The equipment used is very inexpensive and of simple design and the operating costs are low, making this process from a manufacturing viewpoint, very attractive.

Generally speaking, the process involves passing a solution of a crude streptomycin salt in a suitable volatile organic solvent over an acid-treated alumina chromatographic column. The contaminating substances present in the solution including the pigments are strongly adsorbed on the column while the highly potent and pure antibiotic rapidly passes off in the effluent and is recovered therefrom. The streptomycin appears to pass down the chromatographic column at a rate faster than that of most of the other components of the crude concentrate, i. e., it is least strongly adsorbed. The constituents of different adsorptive powers are spaced along the height of the column, the most highly adsorbed being found at the top of the column and the least adsorbed being found at the bottom of the column, or in the effluent. Treatment of the streptomycin solutions by this method removes most of these impurities and leaves the active material in solution in a form that is readily isolable.

Although chromatographic grade of alumina manufactured by the Harshaw Company of Cleveland, Ohio, has been used to a great extent, the choice of an alumina for use in this chromatographic process is not restricted thereto since any chromatographic grade of alumina can be used. The adsorbent is generally pre-treated by washing with water to remove fines and soluble material and is then placed in the column where the chromatographic separation will be effected.

It is possible to employ a wide variety of organic solvents in this process, the only restriction being that these solvents are volatile and water-miscible. Solvents that can be commonly used and are suitable for the process include acetone, methanol, ethanol, isopropanol, etc. and mixtures thereof. Because of its low cost and general availability, the use of methanol is preferred.

In a specific embodiment of this invention, a column containing about 1 kilogram of Harshaw alumina of chromatographic grade (treated in the manner as indicated above) is acidified with any of the common mineral acids, such as hydrochloric acid, sulphuric acid, phosphoric acid, etc. and backwashed with distilled water until the pH of the effluent ranges between about 3.0 to 4.0. This narrow pH range is essential and specific to this process and should not be exceeded, otherwise the degree of adsorption of impurities and yield of the antibiotic are adversely affected. The column is then dehydrated with the solvent to be used.

A solution of a crude streptomycin salt, i. e. streptomycin hydrochloride, streptomycin p-toluene sulfonate, streptomycin calcium trihydrochloride calcium chloride complex in a solvent, such as aqueous methanol, at a pH of about 5.0, at a concentration ranging between about 35,000–60,000 micrograms of streptomycin base per milliliter of solution, possessing a purity varying between about 350–550 micrograms per milligram (containing solids in the solution ranging from about 14–35 gms./kg. of alumina in the column), is fed to the column, and then the chromatogram is developed with the specific solvent used. The various stages in the development of the chromatogram are followed by checking the electrical conductivity of the solution on small fractions of the eluant.

In connection with this point, it has been found that a conductivity bridge such as one manufactured by Industrial Instruments, Inc., Jersey City, New Jersey, can be conveniently used to measure the concentration of the ionic material in the solution. Since it is known that the highly purified streptomycin salt is continuously discharged from the column until the resistivity of the effluent reaches a minimum, or a point slightly beyond this minimum, electrical conductivity measurements furnish an excellent and effective method for determining that portion of the effluent containing the purified material. Accordingly, the collection of the column effluent is begun at a resistivity of about 15,000 ohms proceeding through a minimum resistivity varying between about 250–650 ohms and is then discontinued at a point where it is definitely indicated that the resistivity is steadily increasing, i. e., at a resistance of about 1,000 ohms. The solvent is removed from this portion of the effluent in any suitable manner, such as for example, by evaporation, and after drying this residual concentrate, the antibiotic material is obtained in the form of a white amorphous powder.

If it is desired to recover the streptomycin in the form of its sulfate from another streptomycin salt dissolved in any of the developing solvents used in this invention, this is readily accomplished by a metathesis reaction involving the addition of any sulfate salt soluble in said solvent to the purified streptomycin salt solution, the insoluble streptomycin sulfate being precipitated. Generally, the use of amine sulfates such as isopropylamine sulfate, ethylamine sulfate, pyridine sulfate, dimethylaniline, diethylaniline, and triethylamine sulfates, etc. has been found to be satisfactory in this conversion. Because of the excellent results obtained, i. e., high yields, and the ease of reaction, the use of isopropylamine sulfate is preferred. Similar results have been obtained by the use of inorganic sulfates such as magnesium sulfate.

Thus, the effluent containing the bulk of the streptomycin activity is treated with a suitable sulfate salt and the insoluble streptomycin sulfate is precipitated, separated by filtration, and then dried. The recovered product in the form of a white amorphous powder varies in potency from about 725–780 units/mg., recoveries extending beyond 75% of the active material charged to the alumina column being obtained consistently.

A further increase in the recovery of streptomycin activity can be effected by continuing to collect the effluent material passing through the alumina adsorption column after the portion containing substantially all of the antibiotic of high purity has been obtained. While this latter fraction of antibiotic material is of relatively lower purity, streptomycin of high purity can be extracted therefrom by evaporating the solvent and then chromatographing this portion. The complete process is repeated, the solution being percolated over the adsorption column, and then the antibiotic of high potency is recovered from the effluent.

The assay results of the dried material are obtained by the plate cup method using *B. subtilis* as the test organism compared with the working standard obtained from the Food and Drug Administration, as fully described in the "Compilation of Regulations for Tests and Methods of Assay," published by the Food and Drug Administration of the Federal Security Agency.

The following examples illustrate the methods of carrying out the present invention, but it is to be understood that these examples are given by way of illustration and not of limitation:

*Example I*

A column containing one kilo of Harshaw alumina (chromatographic grade) is acidified with hydrochloride acid and backwashed with distilled water to an effluent pH of 3.0 and subsequently dehydrated with anhydrous methanol.

The solution of crude streptomycin hydrochloride in 80% methanol (containing 26.8 gms. of solid, purity 597 mcg./mg. potency of 50,000 mcg./ml., pH 5.6) is fed to the column and the chromatogram developed with anhydrous methanol. The development of the chromatogram is followed by checking conductivity on small fractions of the eluant. The highly purified streptomycin hydrochloride continues to discharge from the column until the resistivity reaches a minimum or slightly beyond the minimum.

The collection of the column effluent is begun at a resistivity of 5,500 ohms, proceeding through a minimum of 370 ohms and is discontinued at a resistivity of 1,020 ohms.

This effluent contains the bulk of the streptomycin activity and is concentrated in vacuo. The purified streptomycin hydrochloride weighs 18.7 gms. (dry basis) and has a purity of 725 mcg./mg. This represents a recovery of 85% of the activity charge to the alumina column.

The treated adsorption column can be used continuously without appreciably impairing its efficiency in separating streptomycin from the impurities in the crude solution. As a practical matter, it has been found that best operating results are obtained when the column is periodically washed and re-treated. This involves thoroughly washing the column with distilled water, acidifying with a mineral acid until the proper pH range is reached, followed by dehydration with a polar, water-miscible organic solvent. Usually, a plurality of these columns are operating simultaneously so that when one or two of these columns are being rewashed and retreated, the other columns can be used without disturbing the continuity of the purification operation.

*Example II*

A column containing one kilo of Harshaw alumina (chromatographic grade) is acidified with hydrochloric acid and backwashed with distilled water to an effluent pH of 3.8 and subsequently dehydrated with anhydrous methanol.

The solution of crude streptomycin hydrochloride in 80% methanol (containing 24.9 gms. of solid, purity 550 mcg./mg., potency 38,000 mcg./ml. at a pH of 6.2) is fed to the column and the chromatogram developed with anhydrous methanol.

The collection of the column effluent is begun at a resistivity of 15,400 ohms, proceeding through a minimum of 505 ohms and is discontinued at a resistivity of 1,020 ohms.

This effluent contains the bulk of the streptomycin activity and is treated with 19.3 ml. of a 60% aqueous solution of isopropylamine sulfate and the streptomycin sulfate precipitated. This precipitate is redissolved in water at a concentration of approximately 100,000 mcg./ml. and reprecipitated by the addition of eight volumes of anhydrous methanol. The purified streptomycin sulfate weighs 14.9 gms. (dry basis) and has a purity of 740 mcg./mg.

This represents a recovery of 80.1% of the activity charged to the alumina column.

*Example III*

A column containing one kilo of Harshaw alumina (chromatographic grade) is acidified and backwashed with distilled water to an effluent of pH 3.3 and subsequently dehydrated with anhydrous methanol.

The solution of crude streptomycin hydrochloride in 80% methanol (containing 31.2 gms. of solid, purity of 514 mcg./mg., potency 57,000 mcg./ml. at a pH of 5.8) is fed to the column and the chromatogram developed with anhydrous methanol.

The collection of the column effluent is begun at a resistivity of 15,000 ohms, proceeding through a minimum of 390 ohms and is discontinued at a resistivity of 550 ohms.

This effluent containing the bulk of the streptomycin activity is treated with 21.4 ml. of a 60% aqueous solution of isopropylamine sulfate and the streptomycin sulfate precipitated. This precipitate is dissolved in water at a concentration of approximately 100,000 mcg./ml. and reprecipitated by the addition of eight volumes of anhydrous methanol. The purified streptomycin sulfate weighs 16.0 gms. (dry basis) and has a purity of 750 mcg./mg.

This represents a recovery of 75% of the activity charged to the alumina column.

*Example IV*

A column containing one kilo of Harshaw alumina (chromatographic grade) is acidified with hydrochloric acid and backwashed with distilled water to an effluent pH of 4.0 and subsequently dehydrated with anhydrous methanol.

The solution of crude streptomycin hydrochloride in 80% methanol (containing 14.8 gms. of solid, purity of 616 mcg./mg., potency 40,000 mcg./ml., pH 6.0) is fed to the column, and the chromatogram developed with anhydrous methanol. In this example, the collection of the column effluent is begun at a resistivity of 10,000 ohms, proceeding through a minimum of 660 ohms and collection is discontinued at a resistivity of 1,550 ohms.

This effluent, containing the bulk of the streptomycin activity is treated with 11 ml. of a 60% aqueous solution of isopropylamine sulfate and the streptomycin sulfate precipitated. The purified material weighs 8.55 gms. (dry basis) and has a purity of 783 mcg./mg.

This represents a recovery of 73.5% of the activity charged to the alumina column.

*Example V*

A column containing one kilo of Harshaw alumina (chromatographic grade) is acidified with hydrochloric acid and backwashed with distilled water to an effluent of pH 3.5 and subsequently dehydrated with anhydrous methanol.

The solution of crude streptomycin hydrochloride in 80% methanol (containing 27.1 gms. of solid, purity 498 mcg./mg., potency 54,000 mcg./ml. at pH 6.1) is fed to the column and the chromatogram developed with anhydrous methanol.

The collection of the column effluent is begun at a resistivity of 13,200 ohms, proceeding through a minimum of 265 ohms and is discontinued at a resistivity of 1,070 ohms.

This effluent contains the bulk of the streptomycin activity and is treated with 16.2 ml. of a 60% aqueous solution of isopropylamine sulfate and the streptomycin sulfate precipitated. This precipitate is redissolved in water at a concentration of approximately 100,000 mcg./ml. and reprecipitated by the addition of eight volumes of anhydrous methanol. The purified streptomycin sulfate weighs 14.0 gms. (dry basis) and has a purity of 770 mcg./mg.

This represents a recovery of 78% of the activity charged to the alumina column.

COMPARISON EXAMPLE #1

As an example of the fundamental difference between the above specimens and the former procedure as developed in our laboratory and reported by other investigators, this example is given:

A column containing one kilo of Harshaw alumina (chromatographic grade) is acidified with hydrochloric acid and backwashed with distilled water to an effluent pH of 4.3 and subsequently dehydrated with anhydrous methanol.

The solution of crude streptomycin hydrochloride in 80% methanol (containing 33.1 gms. of solid, purity of 490 mcg./mg., potency 46,500 mcg./ml., pH at 5.9) is fed to the column and the chromatogram developed with anhydrous methanol.

This collection of the column effluent is begun at 530 ohms, proceeding through a minimum of 355 ohms and is discontinued at a resistivity of 1,700 ohms.

This effluent contains some of the streptomycin activity but appreciably less than that recovered from alumina columns adjusted below pH 4.0. The effluent is treated with 10 ml. of a 60% aqueous solution of isopropylamine sulfate and the streptomycin sulfate precipitated. This precipitate is redissolved in water at a concentration of approximately 100,000 mcg./ml. and reprecipitated by the addition of eight volumes of anhydrous methanol. The purified streptomycin sulfate weighs 9.25 gms. (dry basis) and has a purity of 730 mcg./mg. This represents a recovery of 41.6% of the activity charged to the alumina column.

It should be noted that the resistivity readings of the column effluent are actual dial readings of the resistance as measured by the conductivity bridge of Industrial Instruments, Inc. To obtain the specific resistivity of these solutions, the resistance as measured must be divided by the factor of 2.0. Of course it is understood that the resistivity of the effluent can be measured by any suitable instrument or device, the use of the aforementioned conductivity bridge being preferred for this process.

Various changes and modifications may be made in carrying out this invention without departing from the spirit and scope thereof. Insofar as these changes and modifications are within the scope of the appended claims, they are to be considered as part of this invention.

We claim:

1. The process of purifying crude water soluble streptomycin hydrochloride which comprises contacting said streptomycin hydrochloride dissolved in a water-miscible organic solvent containing water with an acidified alumina adsorption column having a pH of from 3.0 to 4.0 and then recovering purified streptomycin from the column effluent.

2. The process of purifying crude streptomycin hydrochloride which comprises contacting said crude streptomycin hydrochloride dissolved in an organic solvent containing water with an acidified alumina adsorption column having a pH of from 3.0 to 4.0 and then recovering purified streptomycin from the column effluent, said organic solvent being selected from the group consisting of acetone, methanol, ethanol, isopropanol, and mixtures thereof.

3. The process of purifying crude streptomycin hydrochloride which comprises contacting the crude streptomycin hydrochloride dissolved in aqueous methanol with an acidified alumina adsorption column having a pH of 3.0 to 4.0 and then recovering purified streptomycin from the column effluent.

4. The process of purifying crude streptomycin hydrochloride which comprises contacting an acidified alumina adsorption column having a pH of from 3 to 4 with a crude streptomycin hydrochloride dissolved in an organic solvent containing water, said organic solvent being selected from the group consisting of acetone, methanol, ethanol, isopropanol, and mixtures thereof, and the water-containing organic solution containing at least 35,000 micrograms of streptomycin base per milliliter having a purity of at least 350 micrograms per milligram, developing the column with a substantially anhydrous organic solvent which is the same as said first mentioned organic solvent, and then recovering purified streptomycin from the column effluent.

5. The process of purifying crude water-soluble streptomycin hydrochloride which comprises contacting an acidified alumina adsorption column having a pH of from 3.0 to 4.0 with an aqueous methanol solution of crude streptomycin hydrochloride, the solution containing at least 35,000 micrograms of streptomycin base per milliliter having a purity of at least 350 micrograms per milligram, developing the column with substantially anhydrous methanol, and then separating purified streptomycin from the column effluent.

6. The process of purifying crude streptomycin hydrochloride which comprises acidifying an alumina adsorption column with hydrochloric acid to provide said adsorption column with a pH of from 3.0 to 4.0, dehydrating the acidified column with substantially anhydrous methanol, percolating an aqueous methanol solution of the crude streptomycin hydrochloride over the dehydrated adsorption column, said solution containing at least 35,000 micrograms of streptomycin base per milliliter having a purity of at least 350 micrograms per milligram, developing the column with substantially anhydrous methanol, and thereafter recovering purified streptomycin from the column effluent.

7. The process of purifying crude water-soluble streptomycin hydrochloride which comprises contacting the crude streptomycin hydrochloride dissolved in an organic solvent containing water with an acidified alumina adsorption column having a pH of from 3.0 to 4.0, measuring the resistivity of the effluent of said column and starting the collection of the effluent when such a measurement indicates that the resistivity of the effluent is not more than 15,000 ohms and discontinuing the collection of the effluent when such a measurement indicates that the resistivity of the effluent has passed beyond the minimal resistivity of the effluent, and then recovering purified streptomycin from the effluent thus collected.

8. The process of purifying crude water-soluble streptomycin hydrochloride which comprises contacting an acidified alumina adsorption column having a pH of from 3.0 to 4.0 with a solution of crude streptomycin hydrochloride dissolved in a water-containing organic solvent selected from the group consisting of acetone, methanol, ethanol, isopropanol, and mixtures thereof, measuring the resistivity of the effluent of said column and starting the collection of a portion of the effluent when the electrical resistivity of said effluent is not more than about 15,000 ohms, continuing said collection through the minimal electrical resistivity point of said effluent and discontinuing said collection when said resistivity has subsequently increased to about 1,000 ohms, and then recovering purified streptomycin from the effluent portion thus obtained.

9. The process of purifying crude streptomycin hydrochloride which comprises contacting an acidified alumina adsorption column having a pH of from 3.0 to 4.0 with an aqueous methanol solution of crude streptomycin hydrochloride having a concentration of at least 35,000 micrograms of streptomycin base per milliliter having a purity of at least 350 micrograms per milliliter, developing the alumina column with substantially anhydrous methanol, measuring the electrical resistivity of the effluent of said column and starting the collection of a portion of effluent when the electrical resistivity of said effluent is not more than about 15,000 ohms, continuing said collection through the minimal electrical resistivity point of said effluent and discontinuing said collection when said resistivity has subsequently increased to about 1,000 ohms, and then recovering purified streptomycin from the effluent portion thus obtained.

HERMAN SOKOL.
ROBERT P. POPINO.

References Cited in the file of this patent

UNITED STATES PATENTS

| Number | Name | Date |
|---|---|---|
| 2,501,014 | Wintersteiner et al. | Mar. 21, 1950 |
| 2,537,941 | Regna et al. | Jan. 9, 1951 |
| 2,540,284 | Peck | Feb. 6, 1951 |
| 2,550,939 | Richardson et al. | May 1, 1951 |

OTHER REFERENCES

Carter et al.: J. Biol. Chem., vol. 160 (1945), p. 337–342.

Vander Brook et al.: J. Biol. Chem., vol. 165 (1946), p. 466–467.

Fried et al.: JACS, vol. 70 (1948), p. 3617–3618.